No. 627,672. Patented June 27, 1899.
W. LANGMUIR.
RUBBER TIRE.
(Application filed Mar. 10, 1899.)
(No Model.)

Witnesses:
C. L. Belcher
W. Lemien

Inventor
Woodburn Langmuir
By
Albert Stevens
Attorney

UNITED STATES PATENT OFFICE.

WOODBURN LANGMUIR, OF NEW YORK, N. Y.

RUBBER TIRE.

SPECIFICATION forming part of Letters Patent No. 627,672, dated June 27, 1899.

Application filed March 10, 1899. Serial No. 708,482. (No model.)

*To all whom it may concern:*

Be it known that I, WOODBURN LANGMUIR, a subject of the Queen of Great Britain, and a resident of New York, in the county of New York and State of New York, have invented certain new and useful Improvements in Rubber Tires, of which the following is a specification.

My invention relates to improvements in rubber tires for vehicles, particularly to the shape and construction of the same.

The object of my invention is to furnish a rubber tire more durable, more resilient, and requiring less rubber than those at present in use.

Figure 1:
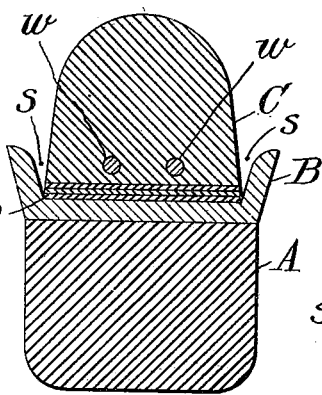
Figure 3:
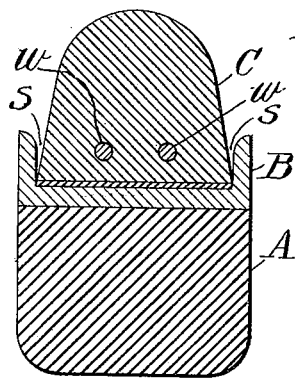
Figure 4:
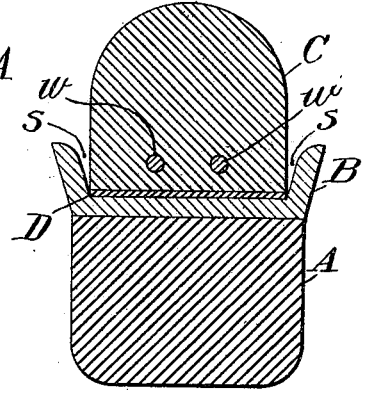
Figure 2:
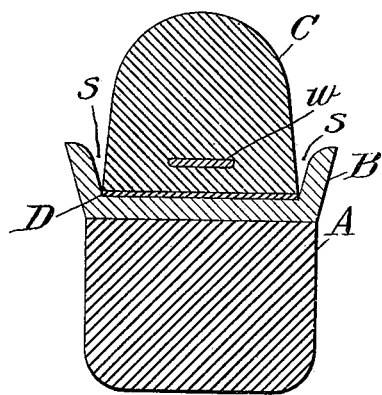
Figure 5:
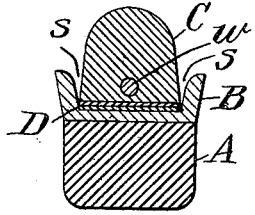

In the drawings, Figure 1 shows my improvement having a multiple-ply base and as attached to a wheel having flaring flanges; Fig. 2, a modification of the same having only a single-ply base and held in place by a metal band instead of wires, as in Fig. 1; Fig. 3, the tire applied to a wheel with straight flange; Fig. 4, a modification in the shape of the tire. Fig. 5 illustrates the application to a small wheel.

Like parts are represented by similar reference-letters in the several figures.

In all the figures, A represents the felly of the wheel; B, the flanges; C, the rubber tire; D, the reinforcing base-strip; *w w*, the means for holding the tire in the flange, and *s s* the space between the flange and the tire.

In present tires it is customary to give such a shape to the tire and vehicle-flange that the exposed sides of the tire are formed at an angle to each other and also to the flanges of the wheel-rim. Moreover, the unexposed portion of the tire, or that portion which is inclosed within the rim, is formed to substantially the same shape as the inner channel of the rim—that is to say, it is tapered from the outside inwardly, so that the sides of the inner or unexposed portion of the tire form with the sides of the exposed portion an obtuse angle. A sample of this construction is shown in the patent to A. W. Grant, No. 554,675, dated February 18, 1896. In absolute contradistinction to such a shape and arrangement of parts my tire does not conform to the shape of the flange or of the channel. Moreover, the sides of my tire are practically a straight line forming an angle with the base without reference to the angle between the flanges and the base. One of the essential features of my tire is that whether the flanges be flaring or straight its shape leaves between the tire and the flanges a V or wedge shaped space, and this for the purpose that others attempt to avoid—viz., the lateral displacement of that portion of the tire between the flanges of the wheel. Furthermore, as distinguished from previous shapes my tire is widest not near the top of the flanges, but at the base.

I can use either a single or multiple ply canvas; but I prefer the multiple ply for reasons to be hereinafter set forth.

The following are the disadvantages of existing constructions which I propose to remedy in my improved tire: First, the flanges cut into the tire at the angle where they meet, thereby allowing the rubber immediately above the flange to project beyond the same when under load; second, that portion of rubber within the channel is useless as a cushion, the channel being entirely filled with practically dead rubber; third, the portion of the rubber embraced in the angle between the unexposed and the exposed part of the tire is useless; fourth, a tendency to creep by reason of its longitudinal compression; fifth, a tendency to open at the joint; sixth, a tendency to split at the wire holes; seventh, the necessity for longitudinal compression.

My improved construction has the following advantages accruing from its shape: First, the entire depth of the tire is available for a cushion; second, the entire width of the tire remains within the flanges; third, there is an economy of rubber in its construction, and the tire, owing to its greater depth of cushion, is more durable; fourth, under load, there being space between the sides of the tire and the flanges, the tire simply fills up this space from the base upward, thereby keeping out dirt and other foreign matter.

Referring to the advantages of multiple-ply fabric, I claim that it provides, first, the tire with a longitudinal resistance sufficient to permit the elimination of compression heretofore employed to prevent the tire from opening at the joint and to leave the periphery in a normal condition; second, it increases the lateral resistance of the tire, at the same time being sufficiently pliable to yield with the tire under severe side strains; third, I am enabled to cut my tire to the exact circumference of the wheel, thereby eliminating the compression and leaving the periphery or wearing-surface of the tire in a slightly-stretched condition, thus providing for the elongation that takes place in usage.

Being enabled to cut my tire substantially to the circumference of the wheel, I economize in rubber, saving several inches on each tire. By my construction, in which I eliminate compression, I lessen the tendency of the tire to creep, and thereby reduce the circumferential strain on the retaining-wires.

Having thus fully set forth and illustrated my invention, what I claim is—

1. In a wheel for vehicles, the combination of a channel having a flanged rim, a solid-rubber tire tapering from the base so as to leave a V-shaped space between the flanges of the rim and the sides of the tire, and wires for retaining the tire within said channel, substantially as described.

2. A vehicle-wheel having a metallic rim, with flanges projecting to form a channel or groove with straight or inclined sides, a rubber tire, the base of which is adapted to rest in said groove or channel, the sides of the tire forming an angle with the base, and leaving a V-shaped space between the tire and the rims of the channel, and independent retaining-wires, passing entirely through the inner portions of said tire, and also within the outer peripheries of the flanges, substantially as described.

3. A vehicle-wheel having a metallic rim, with flanges projecting to form a channel or groove with straight or inclined sides, a rubber tire, the base of which is adapted to rest in said groove or channel, the sides of the tire forming an angle with the base and leaving a V-shaped space between the tire and the rims of the channel, and independent retaining-wires, passing entirely through the inner portions of said tire, substantially as described.

Signed at New York, in the county of New York and State of New York, this 6th day of March, A. D. 1899.

WOODBURN LANGMUIR.

Witnesses:
ORLANDO M. THOWLESS,
W. SEMIEN.